2,978,458

2-AMINO-6-CHLOROBENZOXAZOLE AND PHARMACEUTICALLY ACCEPTABLE SALTS

Joseph Sam, Camden, S.C., assignor to McNeil Laboratories, Incorporated, Philadelphia, Pa., a corporation of Pennsylvania No Drawing. Filed Feb. 25, 1959, Ser. No. 795,326

3 Claims. (Cl. 260—307)

The present invention relates to novel chemical compounds; and more particularly, the invention relates to 2-amino-6-chlorobenzoxazole and pharmaceutically acceptable salts thereof possessing valuable pharmaceutical properties, including anti-convulsant properties, the ability to relax skeletal muscles and hence to relieve spasticity in animals and man, and uricosuric activity and thus the ability to increase the excretion of uric acid. The present application is a continuation-in-part of application Serial No. 634,158, filed January 15, 1957, now abandoned.

Spasticity is an uncontrolled, involuntary, excessive contraction of one or more skeletal muscles and is a major component of many common disease conditions. It has been difficult if not impossible to relieve clinically. The manifestations of spasticity range in severity from those observed in minor transient injuries to localized areas, such as sprains and strains, through more serious conditions, such as chronic low back pain (lumbago), rheumatoid arthritis and rheumatoid spondylitis to the very severe incapacitating neurological diseases, such as multiple sclerosis, Parkinson's disease, cerebral palsy, and the like.

Mephenesin is known to relieve, in animals, experimentally induced spasticity, that is, to produce relaxation of the skeletal muscles, by a mechanism involving the depression of the polysynaptic pathways of the central nervous system. The activity of this compound is so low and the duration so brief, that it is not feasible to employ this material clinically for the relief of spasticity. In addition, as is known, the administration of this material produces undesirable side effects, such as initial excitement, salivation, nausea and vomiting.

The formation of deposits of uric acid in the system causes painful conditions, principally gout. Salicylates have been used for years as uricosuric agents, however, substantial doses of at least 5 grams daily are required for the uricosuric effect in patients with gout and few patients, particularly those in the older age group, can tolerate these amounts for a sufficiently long period of time without suffering from mental confusion and salicylism. Cinchophen is a more potent uricosuric agent than the salicylates but its toxicity precludes its general use in gout. Probenecid has a uricosuric action similar to that of salicylate and cinchophen and is better tolerated. This material is presently the preferred agent for prolonged treatment of gout.

It is the principal object of the present invention to provide novel chemical compounds possessing valuable pharmaceutical properties.

It is another object of the present invention to provide novel chemical compounds possessing skeletal muscle relaxant properties.

It is still another object of the present invention to provide novel chemical compounds possessing not only valuable skeletal muscle relaxant properties but also anti-convulsant properties.

A further object is to provide novel chemical compounds possessing uricosuric activity.

Other objects, including the provision of novel medical preparations and compositions, a method for the relieving of spasticity in animals and man, and a method for increasing the excretion of uric acid, will become apparent from a consideration of the following specification and claims.

The novel compounds of the present invention are 2-amino-6-chlorobenzoxazole and pharmaceutically acceptable salts thereof.

The compounds of the present invention have been found to produce relaxation of the skeletal muscles by a mechanism involving the depression of the polysynaptic pathways of the central nervous system. Compared to mephenesin, the present compounds are at least four times as active in producing relaxation when given orally, have a wide safety margin between effective dose and lethal dose and lack any significant side effects, including initial excitement, nausea or vomiting. In addition to the foregoing, one of the principal features of the compounds of the present invention is their anti-convulsant properties manifested by their marked ability to counteract or overcome convulsions, which would normally be fatal, caused by strychnine or pentylenetetrazole. The compounds of the present invention have also been found to possess significant uricosuric activity, that is the ability to increase the excretion of uric acid, and, hence, are useful in the treatment of conditions where increased uric acid elimination is indicated.

2-amino-6-chlorobenzoxazole possesses basic properties enabling it to form addition salts with acids. Hence, the compound may be employed either as the base or as a salt. The acid forming the salt may be any inorganic or organic acid producing a pharmaceutically acceptable salt, for example, hydrochloric, hydrobromic, hydriodic, nitric, sulfuric, phosphoric, and the like; acetic, propionic, caproic, stearic, and other acids of this series, and the like; maleic, crotonic, fumaric, oleic, citric, tartaric, lactic, benzoic, naphthoic, salicylic, methane sulphonic, and the like.

If a salt is employed, the salt will be pharmaceutically acceptable, i.e. will be non-toxic in the amounts required for the desired activity, and any toxicity or other undesirable effects which may be imparted should be taken into consideration as well known in the art. Pharmaceutically useful salts should not be substantially more toxic than the compound itself and should be able to be incorporated in liquid or solid pharmaceutical media with a preparation of therapeutically useful compositions.

In employing the compounds of the present invention, they will normally be combined with a significant amount of a pharmaceutical carrier. The carrier may take a wide variety of forms, depending upon the form of the preparation desired for administration. For parenteral injection, the carrier may be sterile water with suitable adjustment of the pH to insure solution of the benzoxazole compound. For example, the base is practically insoluble in water while the salts vary in solubility, and in some cases the solubility of a salt is not sufficient to provide the desired concentration. In this case the pH may be further adjusted. As stated, the preferred form of administration of the present compounds is oral, and the oral dosage may be in the form of a suspension, powder adapted for suspension in liquid media, tablet or capsule. In preparing the compositions in oral dosage form any of the usual pharmaceutical carrier media may be employed, such as gelatin, in the case of capsules; sterile water, glycols, oils, alcohols, and the like in the case of suspensions; starches, sugars, kaolin, salts, lubricants, binders, and the like, in the case of powders and tablets. Tablets represent the most advantageous oral dosage form.

The amount of compound administered and the amount of compound in any pharmaceutical composition or medical preparation may vary somewhat depending upon the severity of the condition and upon the species being treated. As far as administration is concerned, the amount of compound administered may range from that providing as little as about 2 milligrams of the benzoxazole compound per kilogram of body weight to that providing as high as about 100 milligrams of kilogram, preferably, in the case of humans, that providing between about 5 and about 40 milligrams of benzoxazole compound per kilogram of body weight. In pharmaceutical compositions, the concentration of the benzoxazole compound should be at least about 1%, by weight, preferably at least about 2%. The concentration of the benzoxazole compound may vary widely above these figures depending upon the form the composition takes, and in some cases the concentration of the benzoxazole compound may go as high as about 80–90%. Depending also upon the severity of the condition and upon the species being treated, as stated, the amount of benzoxazole compound per dosage unit form may also vary widely. Generally, the compositions per dosage unit will contain at least about 25 milligrams of the benzoxazole compound, and in some cases, such as in compositions for the treatment of large domestic animals, like horses, the amount per dosage unit may range as high as 10,000. In the case of compositions adapted for human administration, the amount will generally range between about 100 and about 1000 milligrams of benzoxazole per dosage unit.

The present invention will be more readily understood from a consideration of the following specific examples which are given for the purposes of illustration and are not intended to limit the scope of the invention in any way.

*Example I*

A mixture of 10 g. (0.05 mole) of 4-chloro-2-hydroxyphenylthiorea, 300 ml. of methanol and 33 g. (0.15 mole) of yellow lead oxide are refluxed with stirring for 3.5 hours. The lead salts are removed by filtration and the filtrate evaporated to dryness in vacuo on a steam bath. Five grams (60%) of orange solid are obtained. The product is dissolved in hot methanol, treated with charcoal and filtered. Evaporation of the methanol and recrystallization of the residue from benzene gives white crystals of 2-amino-6-chlorobenzoxazole, M.P. 184–185°.

The calculated nitrogen content for $C_7H_5ClN_2O$ is: N, 16.6; that found: N, 16.4.

Intraperitoneal injections of a 2% solution of this compound in sterile water containing sufficient hydrochloric acid to solubilize the compound and providing a pH of about 1.5 resulted in a loss of righting reflex by the test subject ranging from 57 to 103 minutes in doses of 50–100 mg./kg. of body weight. Oral preparations in the form of a 2% suspension of this compound in an aqueous solution consisting of 8.6% polyethylene glycol 300, 0.5% sodium carboxymethylcellulose and the remainder water have been administered resulting in an $LD_{50}$ ranging from 200 to 1000 depending upon the species treated, and in each case the dose providing significant relaxation of skeletal muscle as manifested by loss of righting reflux was well below this level.

The anti-convulsant properties of this compound were assayed by testing it against strychnine and pentylenetetrazole. The compound, as a 2% solution in acidified sterile water, was administered at doses of 50, 100 and 200 mg./kg. to various test species. When any visible effects had disappeared the convulsant was administered in a lethal dose, 2 mg./kg. for strychnine and 200 mg./kg. for pentylenetetrazole. The strychnine was administered to test species having received 50 and 100 mg./kg. of the 2-amino-6-chlorobenzoxazole and the pentylenetetrazole was administered to the test subjects which had received 200 mg./kg. of the benzoxazole compound as in the foregoing example. With those test subjects which had received 50 and 100 mg./kg. of the compound, 80% and 20%, respectively, died following administrations of an otherwise lethal dose of strychnine; and with those test subjects which had received 200 mg./kg. of the compound only 10% died following an otherwise lethal dose of pentylenetetrazole.

The uricosuric activity of this compound is illustrated by the following data: A patient suffering from chronic gout and excreting insufficient uric acid at a rate normally of 22 mg. of uric acid/10 mg. of creatinine excreted (the average excretion during four hourly control periods) was given orally four capsules each containing 200 mg. of 2-amino-6-chlorobenzoxazole. Following administration the gout was relieved and the excretion rates of uric acid were as follows:

| | Mg. of uric acid/10 mg. of creatinine excreted |
|---|---|
| During first hour | 42.5 |
| During second hour | 30.9 |
| During third hour | 28.8 |
| During fourth hour | 31.3 |

*Example II*

A solution of 2-amino-6-chlorobenzoxazole, prepared as in Example I, in ether is treated with hydrogen chloride until precipitation is complete. Collection of the resulting solid by filtration and crystallization from a mixture of methanol and ether give 2-amino-6-chlorobenzoxazole hydrochloride.

*Example III*

The following formula may be used for preparing 8000 tablets (10 grain) each containing 250 mg. of 2-amino-6-chlorobenzoxazole:

| | |
|---|---|
| 2-amino-6-chlorobenzoxazole _____g__ | 2000 |
| Milk sugar _____g__ | 800 |
| Dibasic calcium phosphate U.S.P. _____g__ | 1527.2 |
| Starch (filler and disintegrating agent) ____g__ | 799.3 |
| Calcium stearate _____g__ | 56.7 |
| Gelatin solution (1.5 pounds per gallon). | |

*Example IV*

The following formula may be used in preparing 1000 #3 capsules each containing 100 mg. of 2-amino-6-chlorobenzoxazole:

| | |
|---|---|
| 2-amino-6-chlorobenzoxazole _____g__ | 100 |
| Milk sugar _____g__ | 150 |
| Fill weight _____mg__ | 250 |

Modification is possible in the selection of the particular form of the 2-amino-6-chlorobenzoxazole, as well as in the selection of carrier and amount thereof without departing from the scope of this invention.

I claim:

1. A compound selected from the group consisting of 2-amino-6-chlorobenzoxazole and pharmaceutically acceptable acid addition salts thereof.
2. 2-amino-6-chlorobenzoxazole.
3. A pharmaceutically acceptable acid addition salt of 2-amino-6-chlorobenzoxazole.

References Cited in the file of this patent

UNITED STATES PATENTS 2,895,877    Marsh _____ July 21, 1959